June 19, 1951 — G. A. COLLENDER — 2,557,498
SWING JOINT
Filed May 1, 1945 — 2 Sheets-Sheet 1
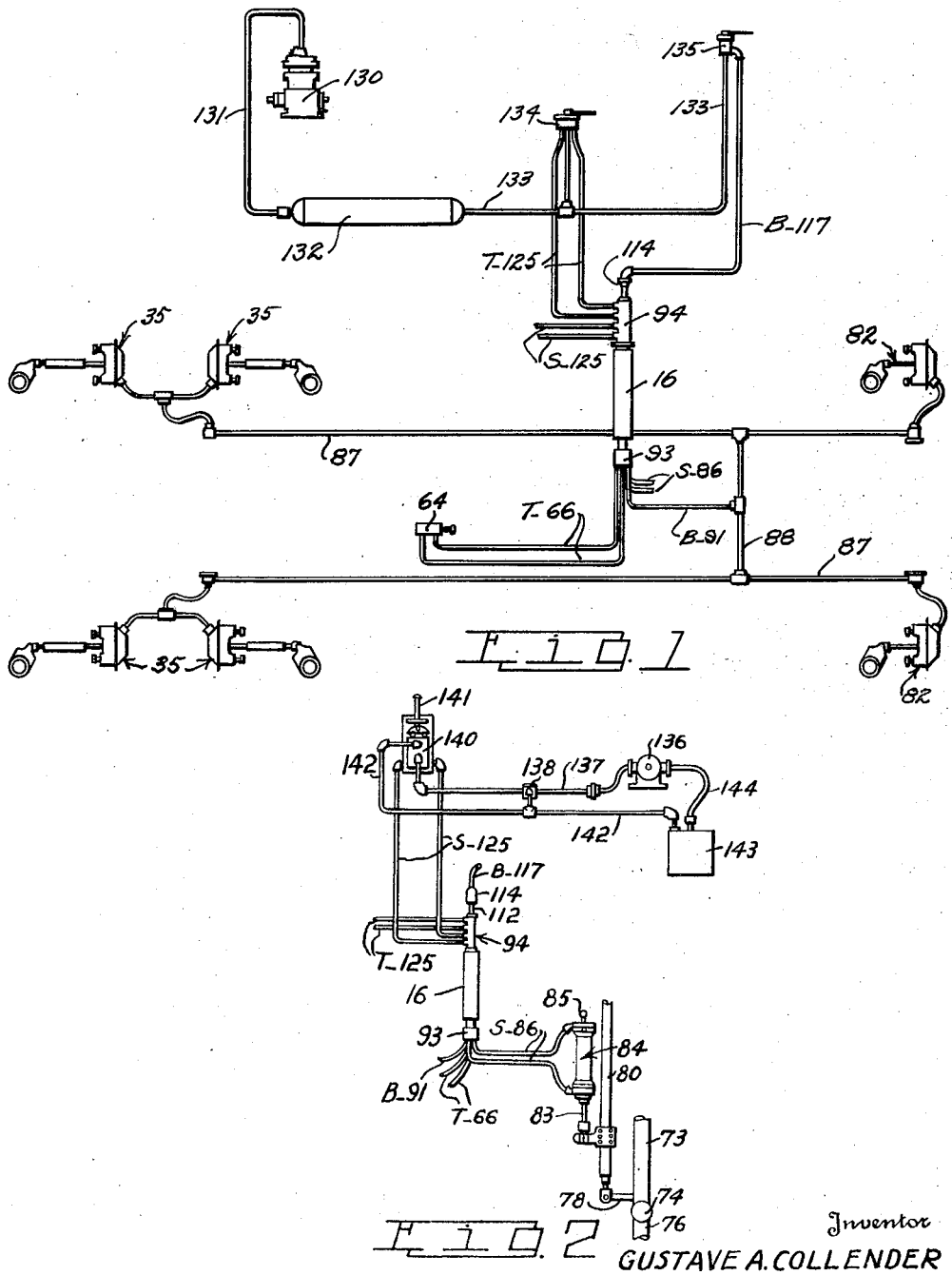
Inventor
GUSTAVE A. COLLENDER
By Ralph L. Stevens
Attorney June 19, 1951 G. A. COLLENDER 2,557,498
SWING JOINT
Filed May 1, 1945 2 Sheets-Sheet 2
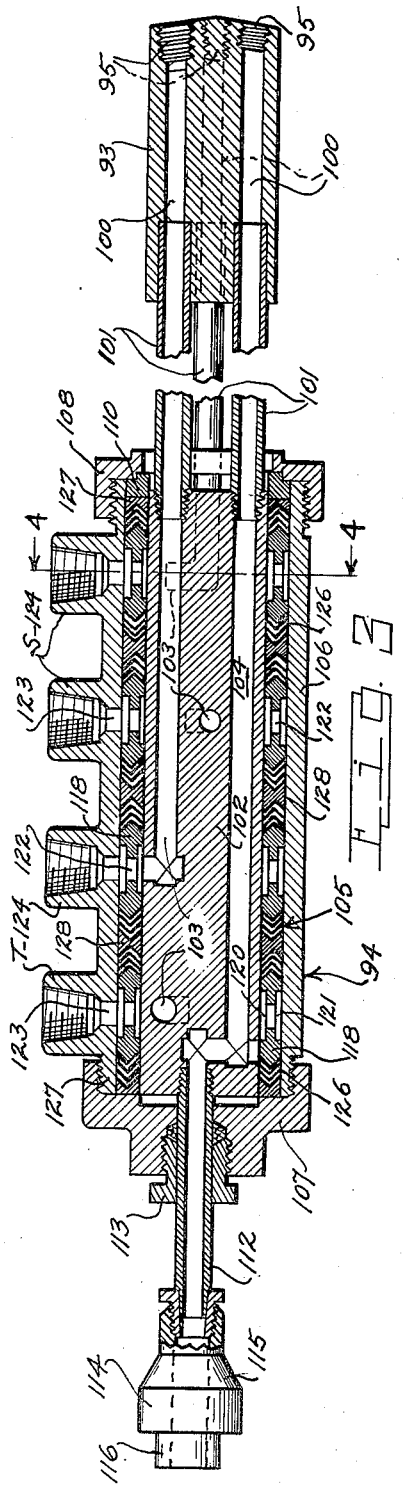
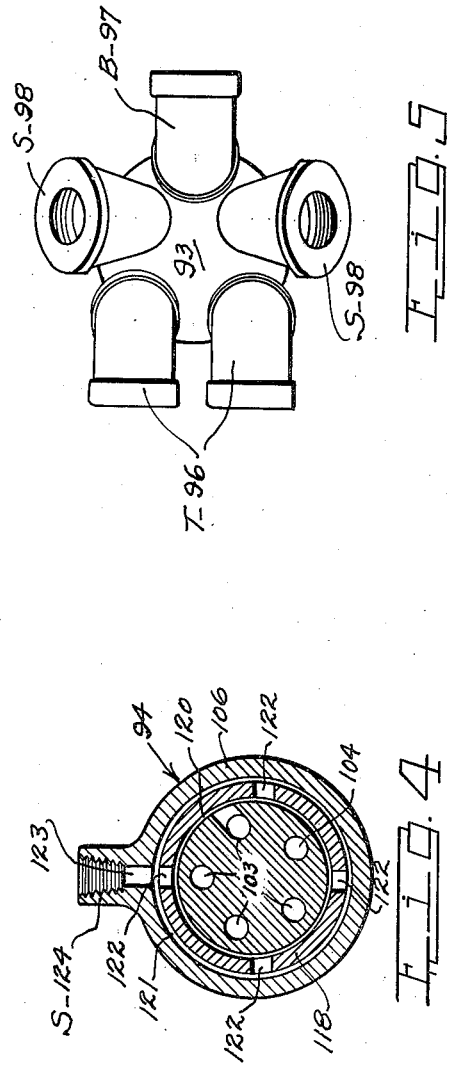
Inventor
GUSTAVE A. COLLENDER
By Ralph L. Stevens
Attorney Patented June 19, 1951

2,557,498

UNITED STATES PATENT OFFICE 2,557,498

SWING JOINT

Gustave A. Collender, Los Angeles, Calif., assignor to Six Wheels, Inc., Los Angeles, Calif., a corporation of California Application May 1, 1945, Serial No. 591,286

4 Claims. (Cl. 285—96.3)

This invention relates to fluid couplings and especially to a swing joint valve for association with crane carriages of the type where the revolvable superstructure embodies a power plant having connections to power actuated mechanisms supported by the undercarriage.

More particularly, the present invention is concerned with a swing joint valve for association with crane carriages of the type wherein a vertical drive shaft extends downwardly from a revolvable cab connection with the tractive mechanism of the carriage. In such vehicles, the power plant and control devices are mounted to revolve with the cab, and the problem arises as to how best to establish connections from the control devices to fluid motors mounted on the carriage for various operational purposes.

It is the primary object of my invention to solve this problem, by placing a hollow vertical drive shaft at the center of cab oscillation and making it of sufficient size to house a plurality of stationary elongated fluid lines that are connected above the carriage to a novel valve unit that is designed to permit oscillation of the cab without rupture of the lines or fluid leakage.

It is a further object to support the valve unit by one of the fluid lines, and to suspend stationarily, from the valve unit, such fluid lines as must pass downwardly through the hollow propeller shaft.

It is a further object to provide an improved multiple fluid valve assembly for connection to at least two sources of fluid under pressure and designed to discharge selectively, into a multiplicity of conduits. In this connection, it is an object to devise a novel packing unit for a rotary or an oscillating valve of such design, for effectively preventing intermingling of the two or more fluids as they pass from the intake to the discharge ports.

The foregoing, and other important objects of my invention will become clear from a study of the following detailed description when taken in conjunction with the accompanying drawings and the appended claims.

In the drawings:

Figure 1 is a schematic view illustrating the manner in which air pressure can be developed and delivered through my novel swing joint valve to the transmission shifter unit and the brakes of the undercarriage of a mobile crane.

Figure 2 is a similar view showing how hydraulic pressure can be developed and applied to the power steering apparatus of the crane undercarriage. Figs. 1 and 2 could be combined to eliminate a few duplicated parts that they have in common, but to do so would cause confusion.

Figure 3 is an enlarged sectional view, taken centrally and vertically through the swivel joint and its associated parts as seen in Figs. 1 and 2.

Figure 4 represents a cross section taken on line 4—4, Fig. 3.

Figure 5 is a bottom end view of Fig. 3, with nipples attached for connection to pressure lines.

As schematically shown in Fig. 1, the brake mechanisms 35 for a set of conventional tandem driven wheels (not shown) comprise the usual air chambers, push rods and slack adjusters, and there is a pair of similar brake mechanisms 82 for the front wheels.

As seen in the schematic view, Fig. 2, separated from Fig. 1 for clarity of illustration, the tie rod 80 for the front axle 73 is coupled by a rod 83 to a conventional hydraulic motor 84 that has a ball-headed pin 85 for universally connecting it to any conveniently adjacent portion of a vehicle chassis frame. The ends of the cylinder of the motor 84 (in this instance illustrated as a servo-motor of the reciprocating piston type), are in communication with fluid lines S—86, valve-controlled by the crane operator in a manner presently explained. Hereafter, where any numeral has a prefix, S refers to steering; T refers to transmission actuation; and B refers to brake-operating means.

Turning again to Fig. 1, the brake mechanisms 35 and 82 are in connection with a pair of longitudinally arranged fluid lines 87 that are connected by cross-branches 88 through a quick-release valve 90 to a compressed air line B—91. The line B—91, like the pipes T—66 and S—86, is coupled to a cylindrical body 93 which is coaxial with the shaft 16. As now to be described, these various fluid lines are connected through and from the body 93, by way of the interior of the hollow propeller shaft 16, to a multi-way valve assembly indicated in its entirety by the numeral 94.

The body 93 has at its lower end (Figs. 3 and 5) five tapped holes 95 for reception of five threaded nipples T—96, B—97, and S—98, to which are coupled the fluid lines T—66, B—91 and S—86, respectively. These tapped holes communicate through five passages 100 with five straight pipes 101 which project upwardly through the shaft 16 into connection with the lower end of the vertically suspended, stationary, valve body 102 of the multi-way valve assembly 94. Four of the pipes 101 in turn communicate with four passages 103 which extend, individually and separately, partially through the body 102 and then branch out radially to the cylindrical surface of the body 102. The fifth pipe, preferably in communication with the line B—91, (since it is single as compared with the dual lines T—66 and S—86), is connected to a passage 104 which goes all the way through the valve body 102, longitudinally thereof, for a reason presently explained.

The stationary valve body 102 is surrounded peripherally by an annular packing sleeve assembly designated in its entirety by the numeral 105; and, surrounding this sleeve there is a rotatable housing comprising a cylindrical sleeve 106 having end caps 107 and 108 secured thereto, adjustably, by screw-threaded interconnection. An anti-friction, annular thrust bearing 110 is fitted between the end cap 108 and the packing sleeve 105 to facilitate relative rotation between the stationary valve body 102 and the valve housing 106 (rotatable with the crane cab).

Coaxially united to the upper end of the valve body 102, and in communication with the passage 104, there is a vertical pipe 112, surrounded by a packing gland unit 113, attached to the cap 107 and designed to seal the joint thus composed while permitting relative rotation between the main valve parts 102 and 106. This pipe 112, in effect, is a suspension element which carries the valve body, the pipes 101 and the body 93, and which maintains the body 93 in such position as to permit the shaft 16 to revolve freely without rotating the body 93.

The vertical pipe 112 must be stationary, towards which effect it is united at its upper end to a special coupling, known as a "Chicksan Swing Joint," which comprises a cylindrical hollow body 114 having a frustro-conical integral extension 115 designed to rest, with adequate lubrication, upon any complemental part carried by the revolvable crane cab. The body 114 also has an upward round extension 116 coupled to a pipe line B—117 arranged to supply compressed air to the vehicle brakes. Before proceeding to the sources of air and hydraulic fluids, let us complete a study of the valve assembly 94 (Figs. 3 and 4).

The valve boy 102 is surrounded by the packing sleeve unit 105 which comprises, preferably, a series (four in this example) of spaced bronze rings 118 alternated with other packing elements. Each ring 118 is annularly grooved, externally at 120, and interiorly at 121, and has a plurality of radial ports 122 for establishing quick communication between the grooves. Each groove 121 communicates with one of the passages 103, and each groove 120 communicates through a radial port 123 with an internally threaded socket formed integral with the valve sleeve 106. There are four of these sockets, viz., two sockets T—124 designed for connection with compressed air pipes T—125, and two sockets S—124 designed for connection with hydraulic fluid pipes S—125.

Each bronze ring 118 has wedge-shaped side edges forced into tight engagement with a plurality of complementally shaped Neoprene rings 126 to form a "chevron" type packing through which there is little or no possibility of fluid escape axially of the valve assembly. At the extreme ends of the packing, suitable bronze rings 127 are provided to engage the adjacent rings 126 and to afford anti-friction surfaces assisting in permitting facile oscillation of the sleeve 106 relative to the stationary valve body 102.

With exclusive reference now to Fig. 1, the compressed air source for the pipe lines B—117 and T—125 comprises a conventional compressor 130, delivering through a tube 131 into a reservoir 132, which in turn discharges into a pipe 133, connected to suitable hand-operable valves 134 and 135.

The valve 134 is of necessity, in this disclosure, a four-way valve designed to admit and exhaust compressed air from either end of the transmission servo-motor 64. The other hand valve, 135, is designed to control the air brake units 35 and 82 in a manner that is conventional except for the interposition of the valve assembly 94 and its associated parts.

Now, with exclusive reference to Fig. 2, hydraulic actuation of the steering mechanism is provided by a conventional oil pump 136, discharging into a line 137 which includes a conventional pop-off valve 138, and thence into a known type of valve 140 having a hand-control lever 141 operable by the crane cab-man. By oscillating the lever 141 into either of its extreme positions, oil or the like is forced into one or the other of the pipes S—125 and thence into one or the other end of the hydraulic servo-motor 84, while the low pressure or exhausting end of the motor 84 discharges backwardly and upwardly through one of the pipes S—125 and thence into a return pipe 142 that dumps into a reservoir 143. The latter is connected by a line 144 to the pump 136, for delivery thereto. Most of this is conventional and here shown to afford an adequate disclosure. My contribution to this aspect of the invention consists mainly in the incorporation of the valve assembly 94 and the association of this assembly with other vital parts.

I wish to be limited in customary manner only by reasonably liberal interpretation of the appended claims.

What is claimed is:

1. In a swing joint valve structure, a casing containing a cylindrical core, relatively rotatable, said casing having a plurality of lateral ports, said core having a corresponding plurality of passageways individually connected to said ports and extending outwardly through one end of said core, and an additional passageway extending entirely through the core from one end to the other thereof.

2. In the structure defined in claim 1, said additional passageway entering said one end of the core axially thereof, and a tubular member connected thereinto axially at said one end so as not to interfere with the relative rotation between said casing and said core.

3. In a swing joint valve structure, a stationary core of circular cross section, a coaxial pipe fixed to one end thereof, a passageway in said core in communication with said pipe and extending to the opposite end of said core, said core having further passageways extending axially from said opposite end and thence opening laterally outwardly, a sleeve oscillatable around the core, and connections to said sleeve and thence therethrough to the last mentioned core passageways.

4. In the structure defined in claim 3, apparatus mounting said connections and thereby said sleeve for swinging movement in a horizontal plane, and means on said apparatus suspending said pipe vertically and rotatable with respect thereto.

GUSTAVE A. COLLENDER.

REFERENCES CITED

The following references are of record in the file of this patent:

UNITED STATES PATENTS

| Number | Name | Date |
|---|---|---|
| 528,773 | Ellis | Nov. 6, 1894 |
| 1,320,635 | Moore | Nov. 4, 1919 |
| 1,697,261 | Daughs | Jan. 1, 1929 |
| 1,777,109 | Stokes, et al. | Sept. 30, 1930 |
| 1,947,363 | Shunk | Feb. 13, 1934 |
| 2,187,147 | Englesson | Jan. 16, 1940 |
| 2,254,192 | White | Aug. 26, 1941 |
| 2,308,137 | White | Jan. 12, 1943 |
| 2,321,927 | McCoy | June 15, 1943 |
| 2,343,491 | Bard | Mar. 7, 1944 |
| 2,343,800 | Rauch | Mar. 7, 1944 |
| 2,372,311 | Brown | Mar. 27, 1945 |